United States Patent Office 2,750,041
Patented June 12, 1956

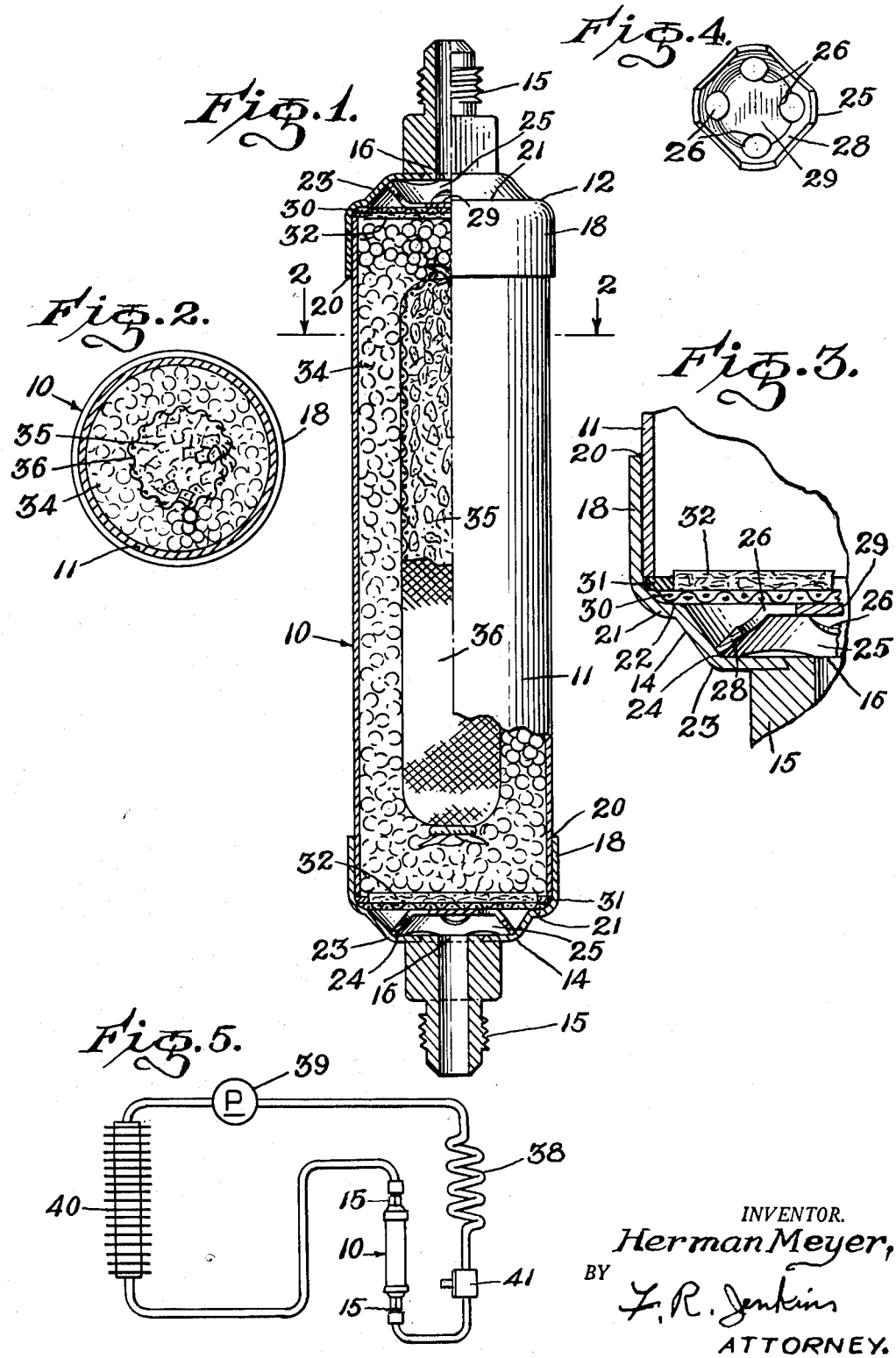

2,750,041

REFRIGERANT DRYING CARTRIDGE

Herman Meyer, Forest Hills, N. Y.

Application September 20, 1954, Serial No. 457,172

11 Claims. (Cl. 210—131)

This invention relates to dehydrating cartridges to be connected into a pipe line carrying fluids containing undesired moisture and more particularly to the dehydration of fluids wihch will not be appreciably affected by carbides of the alkaline earth metals. Dehydration of such fluids is a problem encountered in the operation of Freon refrigeration systems as explained in detail in my co-pending application Serial Number 138,908, now abandoned, filed January 16, 1950.

Small amounts of moisture are frequently present in refrigerants of the halogenated hydrocarbon type such as the various Freons, and methyl chloride, as well as in low boiling hydrocarbons such as propane and butane. Moisture in the hydrocarbons is extremely undesirable when they are used as fuels, as well as refrigerants, since they are passed through a small valve during evaporation or expansion and the moisture will freeze, causing the valve to stick. Both in refrigerating and fuel systems the moisture or ice accumulates in the valves so that even minute proportions in the refrigerant or fuel become concentrated at the valves.

My cartridges may be used in either a vapor or a liquid line, but in closed refrigerating systems I prefer to use it in the fluid line.

In my above mentioned application I merely employed an alkali earth carbide such as calcium carbide as the dehydrating agent, and pointed out that the formation of acetylene did not produce any dangerous conditions even when the refrigerant, such as Freon, was used in a system containing large amounts of copper exposed to the refrigerant. The use of the carbides alone proved very satisfactory when the amounts of moisture to be absorbed were quite small, or when the amount of leakage of water or water vapor into the system was slow. I have now found that the rate of absorption by the carbide alone is not great enough to assure the removal of the moisture before freezing of the valve when large amounts of water have entered, even though the ultimate capacity of the absorber be many times over the amount to be removed.

It has long been known that certain adsorbents, such as silica gel, which depend on physical adsorption, are very quick in action for the removal of a portion of the moisture in situations of the this type. This rate of action, however, is dependent on two factors, the extreme dryness of the absorber, and the concentartion or partial pressure of the moisture in the fluid to be dried. The ultimate capacity of the physical adsorber is only about 20% by weight at atmospheric pressure. Worse than that, as the adsorber approaches exhaustion, its rate of action approaches zero and this is true over substantially the entire life span of the adsorber.

I have found that because most refrigeration systems operate intermittently a combination of a physical adsorber, which acts reversibly, and a chemical absorber such as calcium carbide whose action is for the most part irreversible, will serve as a sorbent better than either can alone.

Initially the physical adsorber more or less soaks up the water, then the chemical or carbide absorber constantly converts the water to acetylene and oxide and hydroxide of calcium, thereby drying the physical absorber until it is in equilibrium with calcium carbide and moisture. Thus, if no additional moisture has entered the system, it is almost as though no physical adsorber were present as far as proportion of moisture is concerned, and yet the adsorber is in about as good condition to take up any large amount that may enter the system.

I have found that if the cartridge is filled with small balls of activated alumina the latter serve admirably as the physical adsorber. Preferably the chemical adsorber is calcium carbide since the partial pressure of water vapor in equilibrium with it is nil and its cost is low.

In the accompanying drawing showing, by way of example, one of many possible embodiments of the invention, Figure 1 is a partial radial sectional view of the cartridge;

Figure 2 shows a section on the line 2—2 of Figure 1;

Figure 3 is a fragmental radial sectional view on a larger scale;

Figure 4 is a bottom plan of a detail of the cartridge, and

Figure 5 shows the cartridge connected in a refrigeration system.

The cartridge 10 comprises a tube 11 of brass, or other suitable material, having at its end caps 12 and 14, both of which are preferably alike, and provided with suitable nipples or connector parts 15 for connecting the cartridge into a pipe line such as one carrying a fluid to be dehydrated. The caps 12 and 14 are of generally round shape each having a central opening 16 on whose marginal portions the connector part 15 is mounted. The cap has a rim flange 18 turned to fit over the outer curved surface of the end portion 19 of the tube and is secured, gas-tight thereto as by solder at 20. The cap near the tube end is flat as at 21 providing an annular portion having an inner surface 22 generally in a plane transverse of the tube axis, while most of the central portion 23 is out-set longitudinally from the tube to provide an internal annular rabbet groove 24 spaced outer from the plane of the end of the tube.

A dished circular bridge member 25 having several large openings 26 therethrough is disposed in each cap with the bridge rim 28 in the groove 24. The central or pole portion 29 of the bridge is without openings and projects about to the plane of the tube ends. The pole portion 29 serves as a central support for a flat wire screen 30 of about 100 mesh disposed on the annular surface 22 in each end of the tube. It is desirable to have a thin annular gasket 31 interposed between the screen and the tube end.

The cartridge is normally mounted in a vertical position with the outlet at the bottom. A felt disk 32 is disposed against the inner face of the screen 30 at the outlet end to catch dust or fines that are lost from balls 34 of activated alumina substantially filling the tube, and prevent the fines from passing into the refrigerant flow. However the moisture capacity of the balls is relatively low in spite of their fast action in adsorbing moisture. The final sorbent is lumps of calcium carbide 35 of great capacity, though slower in action, the lumps being enclosed in a nylon bag 36 in the mass of balls 34.

In operation, a refrigeration system having the usual evaporator or cooling coil 38, pump 39, condenser 40, expansion valve 41 connected by the usual pipe lines, lines of copper or aluminum being suitable for it has been found that even the condenser and evaporator coils may be made of these materials without danger of forming acetylides, operates on any of the Freons, and/or other halogenated hydrocarbons such as methyl chloride. The cartridge 10 is connected into the line of the circulating refrigerant in any suitable location as shown in Figure 5, preferably in the liquid line just before the expansion valve.

While the proportions of the activated alumina to calcium carbide are not critical for general use, about four parts by weight of activated alumina to 1 part by weight of carbide is generally satisfactory. The alumina adsorbs about 20% moisture, by weight, and the calcium carbide takes up over 50%, irreversibly. As the cartridge nears exhaustion, all the carbide has reacted and then only such moisture as the alumina will take up is removed from the fluid.

The carbide lumps, preferably, do not come in contact with the alumina, but are separated therefrom by enclosing the carbide in a bag nestled in among the alumina balls. Nylon is suitable as bag material and need not be especially porous to the passage of liquid water therethrough. Nylon cloth such as is used for shirt material and having a count of about 75 to 125 threads per inch is suitable. The cloth retains calcium hydroxide powder and yet permits the necessary permeation of water as the bag contents swell. The felt disk 32 catches particles of alumina that may be worn loose by mechanical attrition of the alumina balls as the fluid passes through the cartridge.

With the alumina in ball form, the fluid will have a uniform flow through all parts of the tube. Distribution of flow is obtained also by the openings 26 in the bridge member being remote from the center of the connectors 15 and the screens 30 further distribute the flow.

While I prefer alumina as the physical adsorber I may use other water adsorbent material such as silica gel, or even activated charcoal especially as a supplemental adsorber.

The charcoal is especially beneficial in removing any polymer of acetylene such as benzene.

Organic halides on metallic surfaces such as cylinder walls, in sliding friction tend to form halides of the metals. Heretofore, these halides no doubt removed some water by their hydrolysis to the metal oxides found in the liquid traps and to free acids, then thought to be substantially harmless in the nearly anhydrous condition. My invention will however not only neutralize the free acids and fix them as calcium halides, but also adsorb the metal halide, such as iron or aluminum fluoride on the alumina, silica gel or charcoal.

Silica gel and alumina are both weak acid anhydrides and react with sodium hydroxide to form the silicate and aluminate of sodium respectively. Both are refractory and moisture adsorbing.

I claim as my invention:

1. A dehydrating cartridge comprising a container and a reversibly acting physical adsorbent or moisture and an irreversible chemical absorbent for moisture in the container.

2. A cartridge as claimed in claim 1, and means permeable to moisture for preventing contact between the adsorbent and absorbent.

3. In the dehydrating of fluids containing moisture the step of passing the fluid in contact with alumina and an alkaline earth carbide, and interrupting the passage of the fluid so that the fluid becomes stagnant, and the moisture adsorbed on the alumina may diffuse through the liquid to the carbide.

4. A drying cartridge for insertion into a pipe line and comprising a tube having inlet and outlet end portions; caps over each end of the tube, each having a flat annular portion adjacent the tube ends and a central portion longitudinally out-set from the tube end and provided with a connector member for the line, said central portion being provided with an annular internal rabbet groove outer from the plane of the end of the tube; a dish shaped round bridge member having the rim thereof in said groove and having the pole portion thereof projecting substantially to the end of the tube, the member having openings therethrough remote from the pole portion; a wire gauze disk between each said annular portion and the respective tube end and adjacent said pole portion; and solid material for absorbing moisture between the gauze disks.

5. A cartridge as in claim 4 and a felt disk between the solid material and the gauze disk at the outlet end portion of the tube to prevent small portions of said solid material from reaching the gauze.

6. A cartridge as claimed in claim 4 said solid material being a carbide of an alkali earth metal.

7. A cartridge as claimed in claim 6, and a bag within the tube containing said carbide.

8. A cartridge as claimed in claim 7 and an adsorbent material about the bag and in the tube.

9. A cartridge as claimed in claim 8, the adsorbent material being taken from a group consisting of alumina and silica gel.

10. In combination, a tubular housing having an inlet and outlet portion at each end thereof; a closed longitudinal bag containing alkali earth carbide disposed in the housing substantially coaxial therewith, the bag being of material permeable to water vapor; and refractory balls of moisture adsorbent material in the housing and disposed about the bag in all directions.

11. In a combination as claimed in claim 10 the bag being of woven material having a weave sufficiently close to substantially retain the oxide and hydroxide of the alkali earth metal forming the carbide, and said ball being alumina.

References Cited in the file of this patent

UNITED STATES PATENTS

| | | |
|---|---|---|
| 1,866,659 | Little | July 12, 1932 |
| 2,283,989 | Henry | May 26, 1942 |
| 2,365,149 | Anderson | Dec. 19, 1944 |